United States Patent
Zoppas et al.

(10) Patent No.: US 8,342,316 B2
(45) Date of Patent: Jan. 1, 2013

(54) CONVEYING SYSTEM FOR PLASTIC MATERIAL CONTAINERS

(75) Inventors: Matteo Zoppas, Conegliano (IT); Adrian Grando, Mareno di Piave (IT)

(73) Assignee: S.I.P.A Societa' Industrializzazione Progettazione e Automazione S.p.A., Vittorio Veneto (IT)

( * ) Notice: Subject to any disclaimer, the term of this patent is extended or adjusted under 35 U.S.C. 154(b) by 88 days.

(21) Appl. No.: 13/054,741

(22) PCT Filed: Jan. 17, 2009

(86) PCT No.: PCT/EP2009/059220
§ 371 (c)(1), (2), (4) Date: Jan. 18, 2011

(87) PCT Pub. No.: WO2010/007159
PCT Pub. Date: Jan. 21, 2010

(65) Prior Publication Data
US 2011/0127141 A1 Jun. 2, 2011

(51) Int. Cl.
*B65G 47/04* (2006.01)
(52) U.S. Cl. ............. 198/480.1; 198/481.1; 198/397.04
(58) Field of Classification Search .................. 198/379, 198/397.04, 397.05, 394, 470.1, 471.1, 478.1, 198/480.1, 481.1
See application file for complete search history.

(56) References Cited

U.S. PATENT DOCUMENTS

| | | | | |
|---|---|---|---|---|
| 4,174,775 A * | 11/1979 | McKnight et al. | ....... | 198/397.05 |
| 4,561,536 A * | 12/1985 | Weaver et al. | ............. | 198/481.1 |
| 4,938,337 A * | 7/1990 | Jowitt et al. | ............... | 198/377.03 |
| 5,236,337 A * | 8/1993 | Kikuchi et al. | ............. | 198/480.1 |
| 5,404,227 A * | 4/1995 | Sumita et al. | ............. | 198/480.1 |
| 6,058,985 A * | 5/2000 | Petri et al. | ................... | 198/478.1 |
| 7,497,323 B2 * | 3/2009 | Davidson et al. | .......... | 198/474.1 |
| 7,823,717 B2 * | 11/2010 | Zanini et al. | ............... | 198/479.1 |
| 7,987,968 B2 * | 8/2011 | Kobayashi et al. | ........ | 198/689.1 |

FOREIGN PATENT DOCUMENTS

| EP | 0 488 887 A1 | 6/1992 |
|---|---|---|
| EP | 0 920 974 A2 | 6/1999 |

OTHER PUBLICATIONS

International Search Report, Sep. 21, 2009.

* cited by examiner

*Primary Examiner* — James R Bidwell
(74) *Attorney, Agent, or Firm* — Abelman, Frayne & Schwab

(57) ABSTRACT

A conveying system for plastic material container preforms for conveying the preforms to a blow molding machine, comprising angular orientation systems for the containers with respect to a predetermined reference system, capable of orienting the preforms from the step of loading onto a conveying line to the step of blowing the containers in a blowing machine. A corresponding method of orienting the containers is further described, which may be implemented in this system.

18 Claims, 10 Drawing Sheets

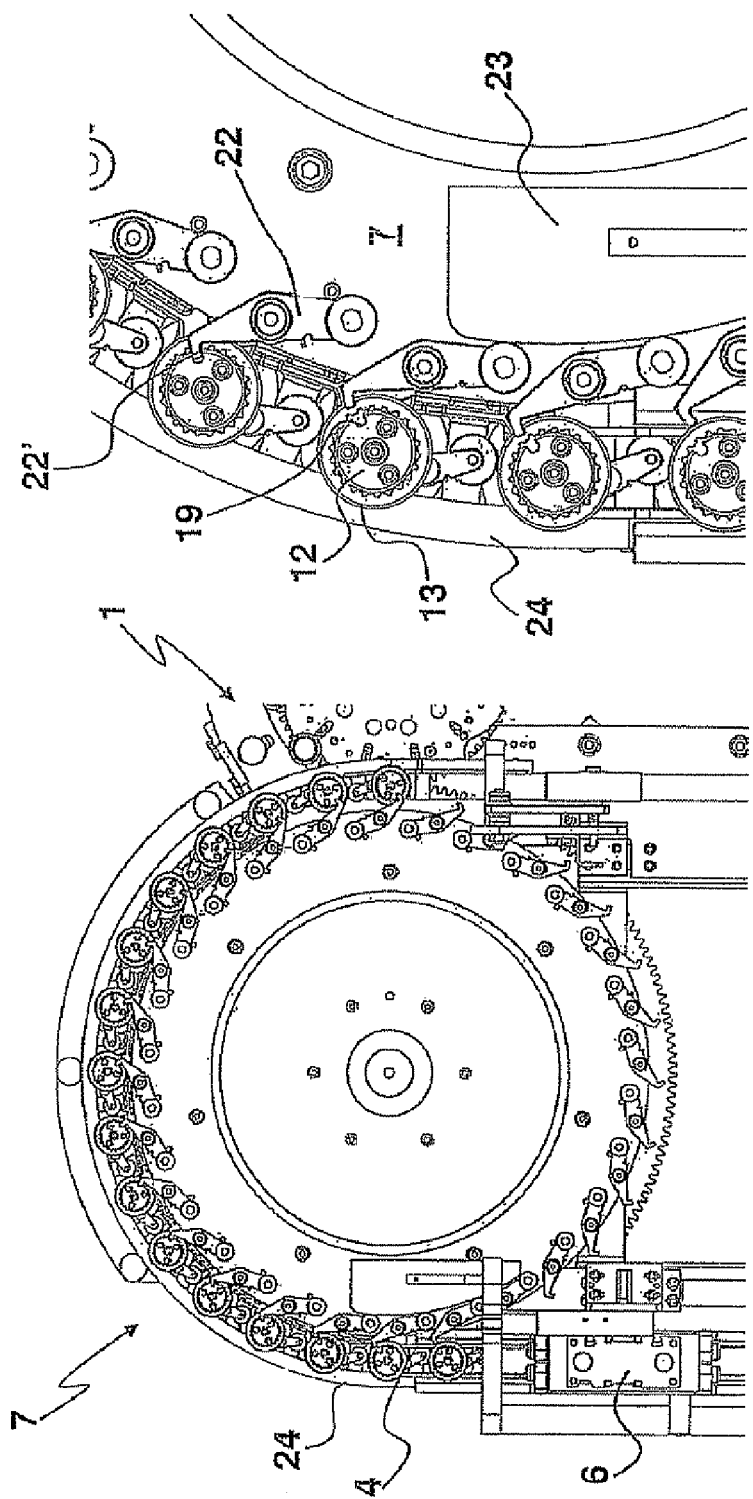

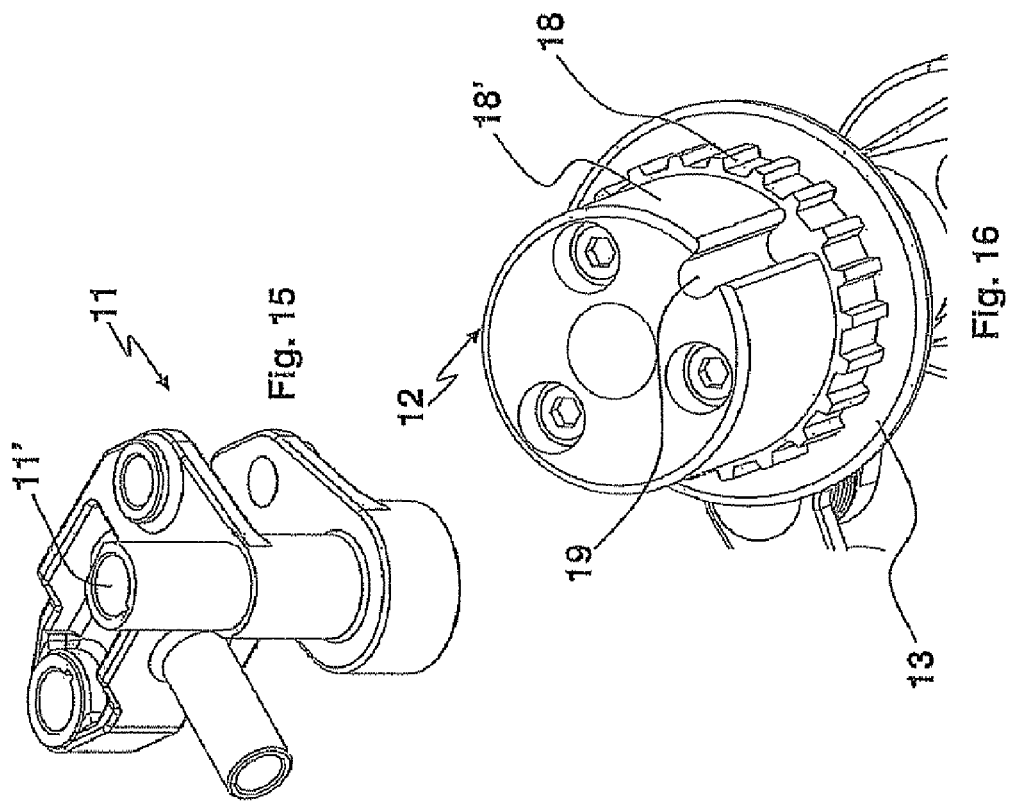
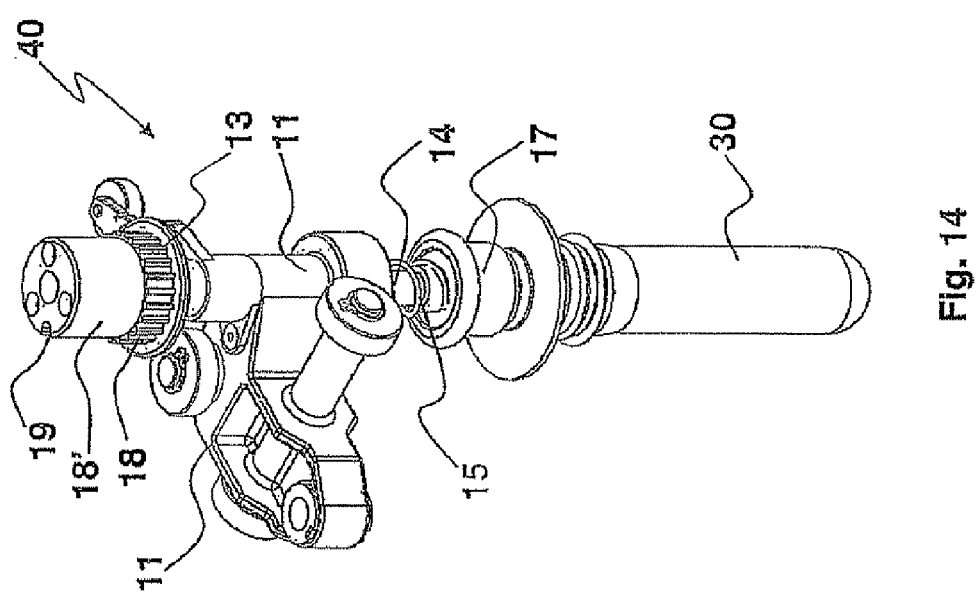

CONVEYING SYSTEM FOR PLASTIC MATERIAL CONTAINERS

Related Applications

This application claims benefit of PCT/EP2009/059220 filed Jul. 17, 2009 and IT Application RM 2008 A 000389 filed Jul. 18, 2008, which are incorporated herein by reference.

FIELD OF THE INVENTION

The present invention relates to a conveying system for plastic material containers, e.g. preforms, in which container orientation systems are included, e.g. systems for orienting the preforms from the step of loading onto a conveying line to the step of blowing the containers in a blowing machine.

STATE OF THE ART

The need to arrange the preforms at a predetermined angular orientation in a production process exists, for example, in the production of containers, made of PET or other plastic materials, by blow molding, when the preforms need to be transferred from the injection molding station, where they were obtained, to the blow molding station, where the container is formed.

For particular types of containers—e.g. for detergent containers with a cap acting as dispenser or sprayer, garden sprayers and, more in general, bottles or containers with caps which are not shaped as a solid of revolution—the cap, once screwed onto the threaded neck of the blown container, must be in a precise angular position with respect to the container itself, which requires the preforms to be inserted in the blowing mold with an accurate, not random orientation of the thread with respect to the mold itself.

If the preforms need to be freely rotated when fed towards the blowing machine, e.g. in the heating ovens, orientation systems for said preforms are thus included to obtain the predetermined orientation before insertion into the molds.

The need to arrange previously blown containers at a predetermined angular orientation in a production process exists, for example, in processes for applying labels or printing letters and/or logos on asymmetric containers.

Various orientation systems for the preforms or containers are known, but these are not an optimal solution.

For example, solutions with identification of the notch on the neck of the preform or container by means of a laser device or photocell are known. This solution does not disadvantageously allow to obtain an accurate orientation: the device requires maximum stability, and thus absence of vibrations, and acts on fields of measures close to 0.1 mm. The notch is further identified by means of complex, very expensive electronic devices.

Another solution includes screwing the pad on the neck, the pad serving the function as a cap. The adopted machine is however very complex and customization costs are high. The complex mechanics with "slow" movements further reduces the productive performance of the machine.

Other solutions include orienting the preform only during the final step of conveying, i.e. immediately before the insertion of the preform into the blowing mold. These solutions disadvantageously require very high precision mechanics, are characterized by "slow" movements and thus low productivity, and considerably reduce the action range, i.e. the types of neck to be oriented.

Furthermore, other solutions which provide for the orientation of the preform and container only during the final step of conveying do not ensure to keep the orientation during the transfer of the preform and container to both the mold and the zone for applying labels or printing letters and/or logos, respectively. The need to provide a novel conveying system for plastic material containers, which allows to overcome the aforesaid drawbacks, is therefore felt.

SUMMARY OF THE INVENTION

It is the primary object of the present invention to provide an efficient conveying system for plastic material containers, in particular performs, provided with angular orientation means of the containers with respect to a predetermined reference system, capable of orienting the performs, for example, from the step of loading onto a conveying line to the step of blowing the containers in a blowing machine. The present invention thus suggests to reach the aforesaid object by providing a conveying system for plastic material containers, in particular performs, the containers being provided with a predetermined reference point, the system comprising,
  a conveying chain for the containers, defining a closed conveying circuit, rotating about a conveying wheel,
  a loading wheel for the containers on the closed conveying circuit, arranged near 30 said conveying wheel,
  a plurality of pads for gripping respective containers in a cooperation zone with the loading wheel, so as to define integral pad-container pairs, said pads being provided on the conveying chain,
  at least one passing zone of the containers, arranged along said closed circuit, in which said integral pad-container pairs are free to rotate about a rotation axis, wherein there are included
  first means for defining the angular position of containers (30) on said loading wheel,
  second means for defining the angular position of pads (40) on said conveying wheel, to orient the pads before gripping the corresponding containers,
  third means for defining the angular position of said integral pad-container pairs for orienting the containers after exiting from said at least one passing zone.

A further aspect of the present invention includes a method of defining the angular position of plastic material containers, in particular preforms, implemented in the aforesaid conveying system, the system comprising a conveying chain for the containers, defining a closed conveying circuit, rotating about a conveying wheel; a loading wheel for the containers on the closed conveying circuit, arranged near said conveying wheel; a plurality of pads for gripping respective containers in a cooperation zone with the loading wheel, so as to define integral preform-container pairs, said pads being provided on the conveying chain; at least one container passing zone, arranged along said closed circuit, wherein said integral pad-container pairs are free to rotate about a rotation axis;
the method comprising the following stages:
  defining the angular position of the containers by means of first angular position defining means on the loading wheel,
  defining the angular position of the pads by means of second angular position defining means on the conveying wheel, before gripping the corresponding containers,
  defining the angular position of the integral pad-container pairs by means of third angular position defining means after exiting from said at least one passing zone. The definition of the angular position of containers on the loading wheel includes operating orientation inserts, by means of a first cam, so that each insert exerts a pressure on a respective container neck until it is inserted into a first recess provided on said neck. Each container is fed on the loading wheel by rotating about an axis thereof by friction with a second cam, arranged outside the loading wheel, until the insert is inserted into the first recess.

Instead, the definition of the angular position of pads on the conveying wheel includes operating a first plurality of levers, by means of a third cam, so that each lever exerts a pressure on a first upper part of a respective pad until a respective protuberance is inserted into a second recess provided on said first upper part. Each pad is fed on the loading wheel by rotating about an axis thereof by friction with a fourth cam, arranged outside the loading wheel, until the protuberance is inserted into the second recess.

Finally, the definition of the angular position of integral pad-container pairs, after exiting from said at least one passing zone, includes operating a second plurality of levers, each provided on a body of a respective pad by means of a fifth cam provided on a track section of the chain so that each lever exerts a pressure on a second upper part of a respective pad until it is inserted by means of the respective protuberance into a third recess provided on said second upper part. Each pad, after exiting from said at least one passing zone, is fed along the conveying line, rotating about an axis thereof by friction with a zone in contact with said track section until the protuberance is inserted into the third recess.

The first and second upper parts of each pad, and thus the second and third recesses, may coincide with an alternative embodiment.

The combination of including preform orientation means with respect to an absolute reference system on the loading drum, and including pad orientation means with respect to said reference system on the conveying chain wheel, arranged near the loading drum, advantageously allows to always know the orientation of the preforms, even when they are free to rotate, for example, along the heating ovens of the conveying circuit for optimizing preform heating. A final orientation of the pad-preform set is advantageously included before ejecting the preforms from the pads to recover the desired entrance position into the blowing machine.

These orientation systems allow to obtain an accurate, not random orientation of the neck thread of the preforms with respect to the mold itself, thus ensuring a perfect molding of the containers with a cap acting as dispenser or sprayer, or, more in general, with caps which are not shaped as solids of revolution.

If the preforms do not need to be rotated in the heating zone, the use of a single preform orientation system on the loading drum with non-adjustable pads may be included.

The advantages of the preform conveying system, object of the present invention, include:
  the possibility of simply changing the orientation angle;
  safer and more robust orientation systems, with better orientation control and no damage to the preform because nearly all the orientation operations are carried out on mechanical parts and not on the preform;
  completely keeping the orientation during the transfer, as the preforms, once oriented, are "positively" gripped and thus the preform may not rotate or loose the final orientation position.

The pads for gripping preforms, provided on at least some of the conveying chain links, comprise a block of integrally and reciprocally fixed elements which are movable with respect to the body of the link. These elements comprise a rotation pinion, a lifting plate, a rotation pin and a quick fastening end of the preform neck.

The Rotation Pinion has Two Specific Functions:
  it allows the rotation of the preform during the whole step of heating, i.e. while crossing the ovens;
  and it allows its angular orientation by means of a notch placed on the side surface thereof. The function of the notch is to identify the accurate position of the pinion and rotation pin as well, and thus of the plastic container to be transported in a first step of conveying.

The Lifting Plate Serves Three Specific Functions:
  it allows the rotation pin to be lifted after having released the preform by means of a specific mechanical cam system, so as to avoid any interference with the preform neck once it has been ejected from the pad;
  it allows the rotation of the rotation pin if the set formed by the pinion, the lifting plate and the pin itself is present in the lifted position, after having released the preform during the transfer towards the cooperation zone with the loading drum;
  it allows the angular orientation thereof by means of a notch placed on its side surface. The function of the latter notch is to identify the accurate position of the pad and thus of the preform integral thereto in a second step of conveying before it is released.

The rotation pin, mechanically secured to the pinion and lifting plate, serves the function of rotating and either raising or lowering the quick fastening end and everything mechanically connected thereto.

A spring, arranged between the quick fastening end and the body of the chain link is compressed when lifting the rotation pin, and thus allows the quick descent of the latter once the lifting plate has been released close to the cooperation zone with the loading drum.

The dependent claims describe preferred embodiments of the invention.

BRIEF DESCRIPTION OF THE DRAWINGS

Further features and advantages of the present invention will be apparent in the light of the detailed description of preferred, but not exclusive, embodiments of a conveying system for plastic material containers shown by way of non-limitative example, with the aid of the accompanying drawings, in which:

FIG. 6 is a top view of a wheel of the conveying line of the system in FIG. 1;

FIG. 7 is an enlarged view of part of the view in FIG. 6;

FIG. 14 is an axonometric view of a link with a preform fastened to the pad;

FIG. 15 is an axonometric view of the body of a chain link;

FIG. 16 is an enlarged view of a component of the chain link.

DETAILED DESCRIPTION OF A PREFERRED EMBODIMENT OF THE INVENTION

Figure 1:
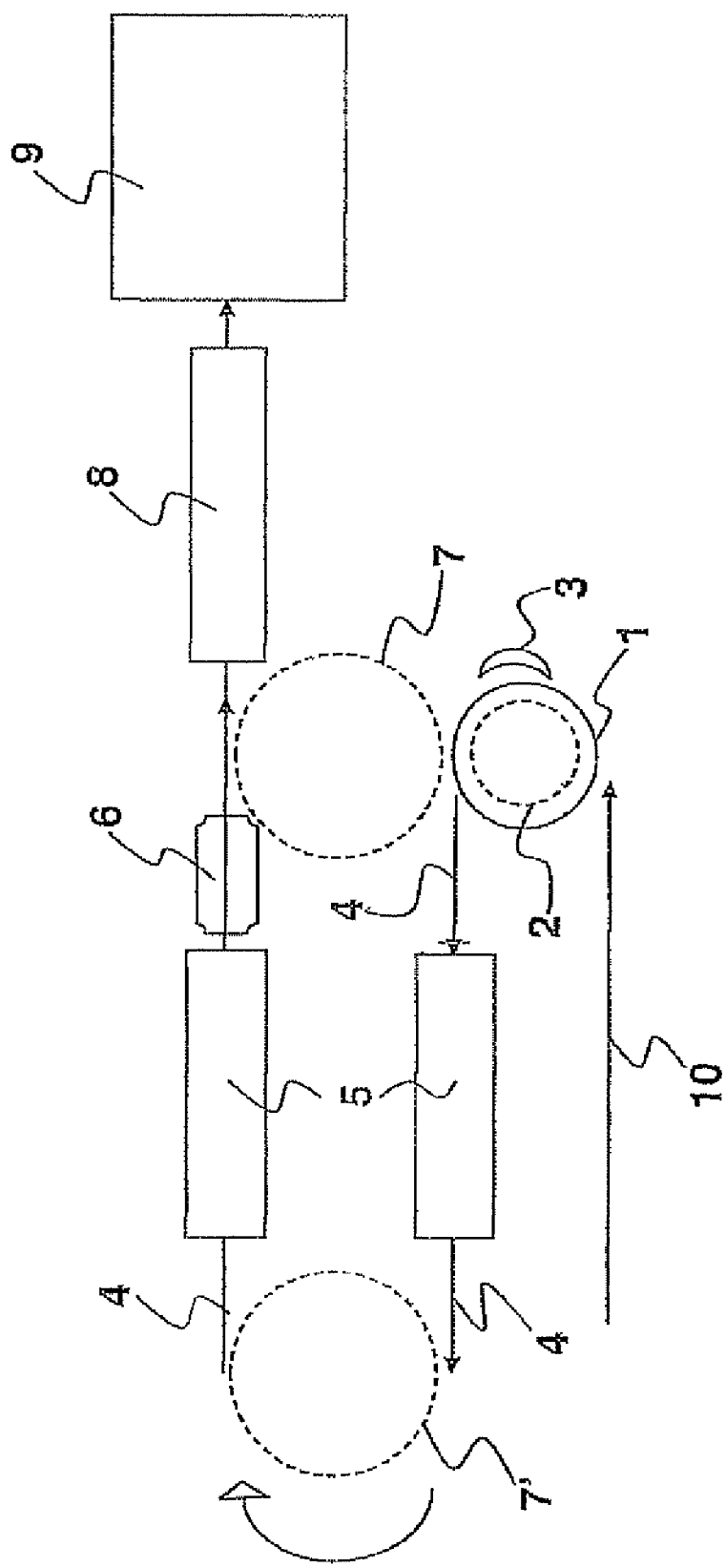
FIG. 1 is a diagrammatic layout of part of a preform conveying system according to the present invention.
Figure 2A:
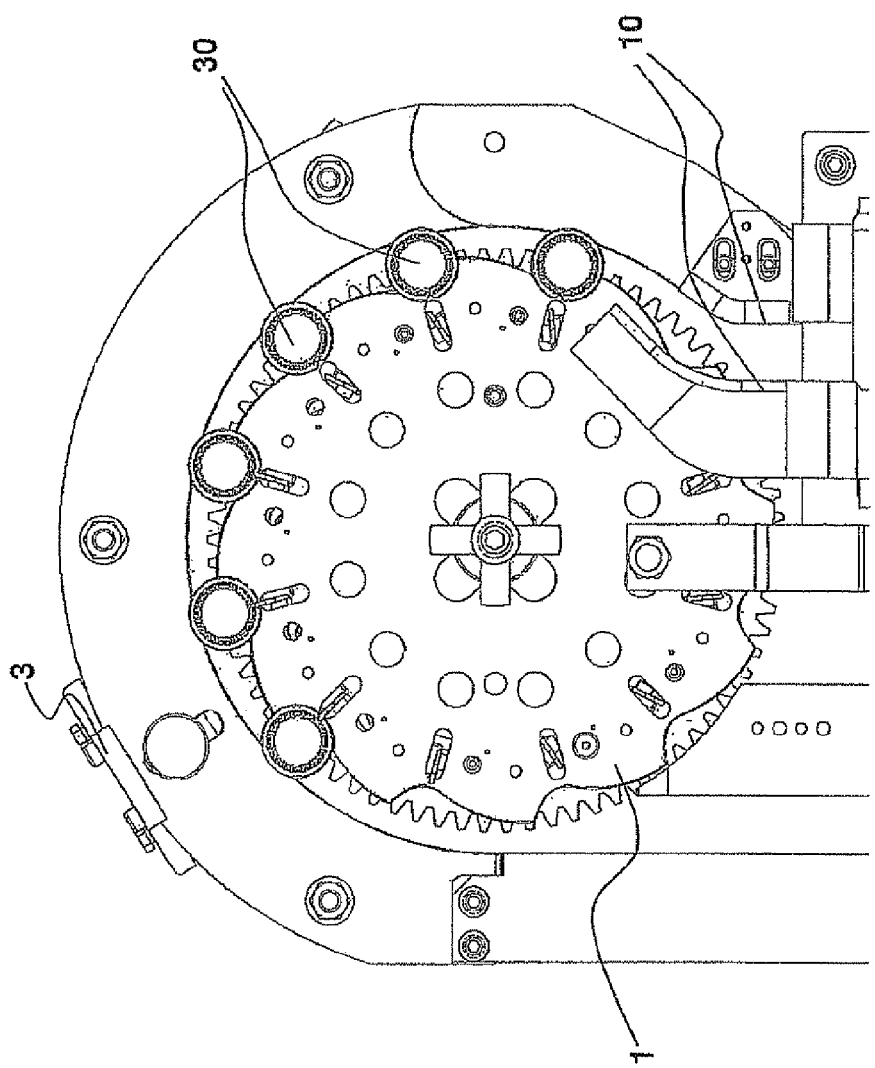
FIG. 2a is a top view of the loading drum of the conveying line of the system in FIG. 1.
Figure 2B:
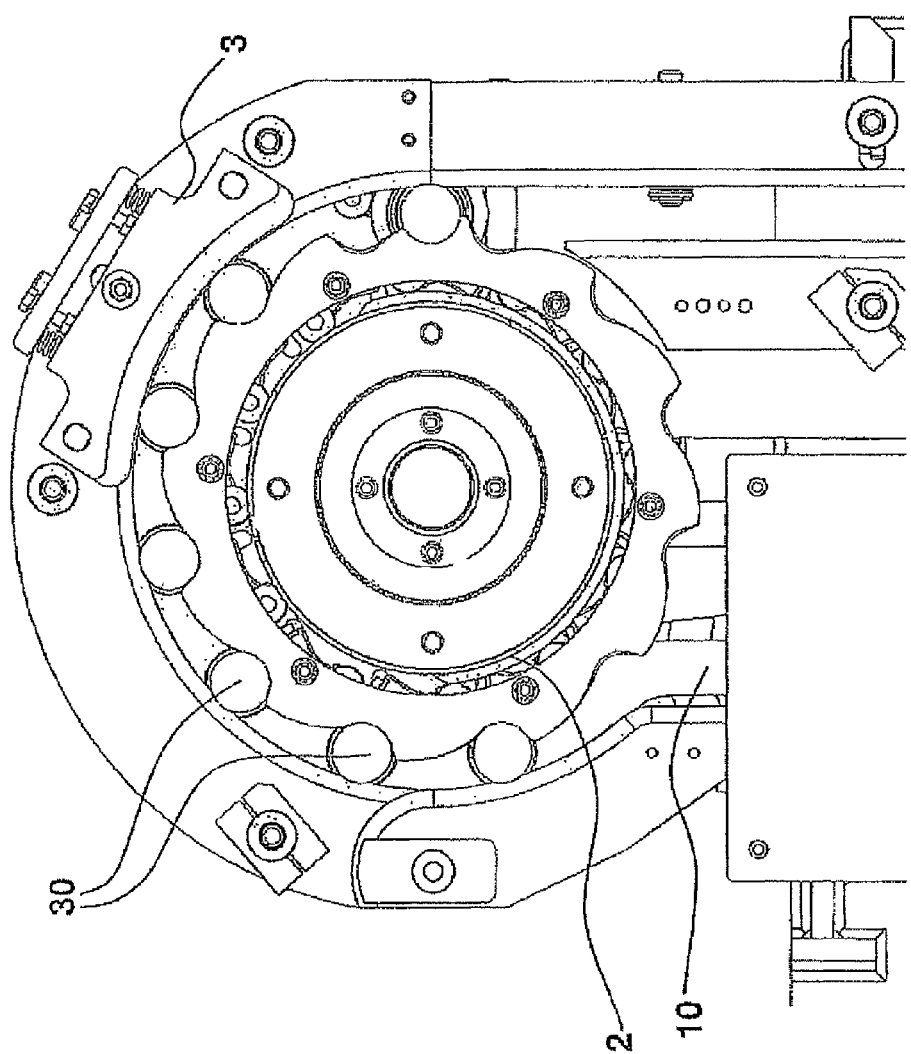
FIG. 2b is a bottom view of the loading drum of the conveying line of the system in FIG. 1.

FIG. 1 shows a layout of a conveying system for preforms of plastic material containers comprising a conveying line and a linear-type blowing machine 9.

Structure of the Conveying Line

The Preform Conveying Line Comprises:
- a loading chute 10;
- a preform loading drum or wheel 1;
- a conveying chain 4, defining a closed circuit, in which at least some links thereof include a pad for gripping and ejecting a respective preform;
- conveying wheels 7, 7', on which the conveying chain runs;
- at least one passing zone in which the preforms are free to rotate when fed, e.g. comprising at least one preform heating oven 5;
- a preform orientation zone 6, possibly with varying pitch;
- a feeding zone 8, possibly with varying pitch, of the oriented preforms towards the blowing machine 9.

In the embodiment of the system illustrated in FIG. 1, conveying chain 4 follows a circuit from the wheel 7 crossing the heating ovens 5 and the orientation zone 6 for successively reaching wheel 7 again.

The preforms are fastened to the chain 4 by the pads 40 in a cooperation zone of the wheel 7 with the loading drum 1, while the preforms are ejected from the chain 4 in a cooperation zone of the same wheel 7 with the orientation zone 6 of the preforms, which will subsequently be transported, by means of a feeding device, possibly with varying pitch, to the blowing machine 9.

A fixed cam guide or track 24, being substantially concentric semicircle-shaped and external to the wheel 7 in plan and arranged between these two cooperation zones, has a profile which includes a rise with respect to the plane of the closed conveying circuit, i.e. the plane on which the chain links run. Such a fixed cam guide or track allows a first end to lift the pads by means of a first chute, at an entrance zone of the pads on the wheel 7, and a second end to lower said pads by means of a second chute, at the outlet zone of the pads from said wheel 7, for fastening new preforms which rotate on the loading drum.

Each Pad 40 Comprises:
- a body 11, which may be fastened to a link of the conveying chain 4, and is completely made of plastic material, shown in FIG. 15;
- a rotation pinion 12, arranged over the body 11;
- a lifting plate 13, arranged between the pinion 12 and an upper abutting surface of the body 11;
- a rotation pin 14, axially sliding through the body 11 and mechanically secured to a first end of pinion 12 and to the plate 13;
- a quick fastening end 17 for the preforms, mechanically secured to the second end of the pin 14;
- a spring 15, arranged between the quick fastening end 17 and a lower abutting surface of the body 11;
- a spring 16'/orientation lever 16" system, firmly connected to the body 11 of the pad, for the final orientation of the preforms in the orientation zone 6.

Pinion 12, plate 13, pin 14 and quick fastening end 17 are integrally fixed to one another and may rotate about a common axis and/or translate along said common axis.

The rotation pinion 12 comprises a toothed or knurled zone 18 and a smooth zone 18' provided with an orientation notch 19 to fix a predetermined angular orientation of the pad in a first step of conveying.

The toothed or knurled zone 18 allows the coupling with a toothed belt or other suitable motion transmission means included in at least one zone of the conveying line in which the pads, and thus the preforms fastened thereto, are rotated to optimize the heating of the preforms before the step of blow molding.

In the preferred embodiment shown in the figures, the toothed zone 18 is the lower part of the pinion 12, while the smooth zone 18' is the upper part.

Other variants may include, instead, the toothed zone arranged in the upper part and the smooth zone arranged in the lower part of the pinion or, alternatively, the toothed zone arranged in a central section of the pinion and the smooth zone divided into two sections (upper and lower sections) spaced out by said central section, wherein at least one of said two sections is provided with the orientation notch.

The lifting plate 13 comprises two flat cylindrical sections (upper and lower sections) which are coaxial and have a different diameter. The lower cylindrical section, of smaller diameter, is provided with an orientation notch 20 to fix a predetermined angular orientation of the pad in a second step of conveying. Such a plate 13 allows, by coupling the upper cylindrical section with the fixed cam guide or track 24, to lift the whole pad, after having released the preform or container, with respect to the plane on which the conveying circuit and thus the links of the conveying chain lay.

The plate 13 may also allow the pads to rotate about an axis thereof, in the absence of friction in the toothed zone 18 of the pinion 12, operated by the friction between the base or side surface of the upper cylindrical section of the plate 13 with the fixed cam track 24, arranged outside the conveying wheel 7. This rotation is used to orient the pads on said conveying wheel by inserting respective bolts in the orientation notch 20.

The rotation pin 14, mechanically secured to pinion 12 and lifting plate 13, serves the function of rotating and either raising or lowering the quick fastening end 17 and everything mechanically connected thereto. Lifting the rotation pin 14, and thus the quick fastening end 17, with respect to the plane on which the conveying chain moves, implies the compression of the spring 15. The elastic force of this compressed spring allows a quick lowering of the pad at the zone in which the containers or preforms are fastened, after releasing the lifting plate 13 at the end of the specific fixed cam guide or track 24.

Finally, the quick fastening end 17 is provided with one or more mechanical parts, customized on a case-by-case basis according to the type of preform to be fastened and conveyed.

In the spring 16'/orientation lever 16" system, firmly connected to the body 11 of the pad, the orientation lever 16" is advantageously hinged onto a pin, fixed to the body 11, about which the spring 16' is arranged, and provided at a first end of a protuberance 27, e.g. bolt-shaped, adapted to be inserted into the orientation notch 20 provided on the lifting plate 13. At a second end of the lever 16", instead, a rounded part is provided serving as tappet element which, following the profile of a cam, provided along a track section of the conveying chain, operates the lever 16" by contacting the protuberance 27 with the lower cylindrical section of the plate 13 containing the notch 20. During this contact, the pad is advantageously rotating about an axis thereof by the friction which is generated between the upper cylindrical section of the plate 13 and a contact zone on said track section. This rotation, which continues for a maximum angle of about 360°, allows the protuberance 27 to be inserted into the notch 20.

The spring 16', when the lever 16" is operated, exerts the necessary pressure force to insert the protuberance 27 into the notch or slot 20.

The notches or slots 19 and 20 are generally reciprocally offset but could however be also reciprocally aligned.

The body 11 of the pad has rollers for a greater feeding stability of the chain along the conveying circuit track.

In an alternative variant, a single orientation notch may be provided on the pad 40 provided on the rotation pinion or the lifting plate.

A first orientation system for the preforms on the loading drum and/or a second orientation system for the pads on the wheel 7 are advantageously included.

Orientation System for the Preforms on the Loading Drum

The orientation system for the preforms, provided on the loading drum 1, comprises a cam 2, arranged under the loading drum, adapted to operate positioning or orienting inserts 2' for the preforms, and a fixed cam 3, arranged outside the loading drum and configured so as to generate a rotation of the preforms about an axis thereof by friction. These inserts 2' protrude from specific slots, provided on the loading drum 1, so as to be able to directly cooperate, once operated, with the neck of the preforms when feeding them.

Figure 3:
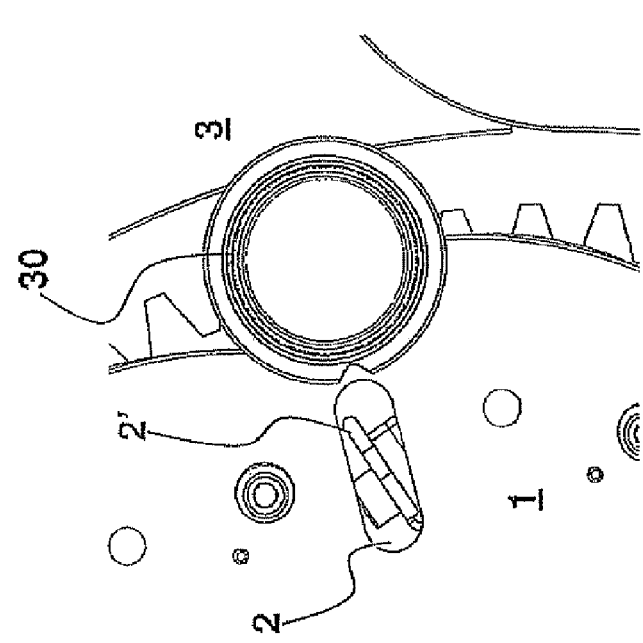

A preform 30, descending along the loading chute 10, enters the loading drum 1. During such a step, the cam 2 makes the corresponding positioning insert 2' retract with respect to the external rotation guide 3 of the preform (FIGS. 3 and 5a).

Figure 4:
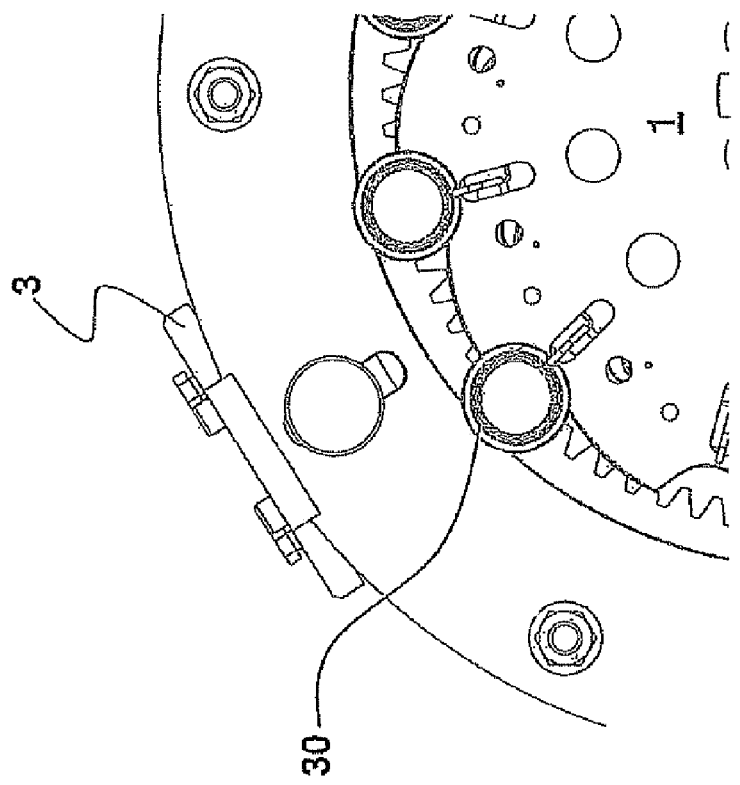
FIGS. 3 and 4 are enlarged views of parts in FIG. 2.

A friction is generated between preform 30 and external guide 3 during the rotation of the loading drum, which automatically produces the rotation of the neck of the preform about the axis thereof. The preform thus rotates and is fed at the same time. The insert 2' is concurrently operated by the cam 2, which creates a slight pressure on the neck of the preform 30 to meet an orientation notch 21 (FIGS. 4 and 5b) provided on the neck of the preform itself, e.g. on the annular protrusion or neck ring 31. At this point, the preform is perfectly oriented with respect to the loading drum 1. The orientation notch 21 may be provided at a starting point of the thread for screwing the cap or in another predetermined reference point.

Figure 5A:
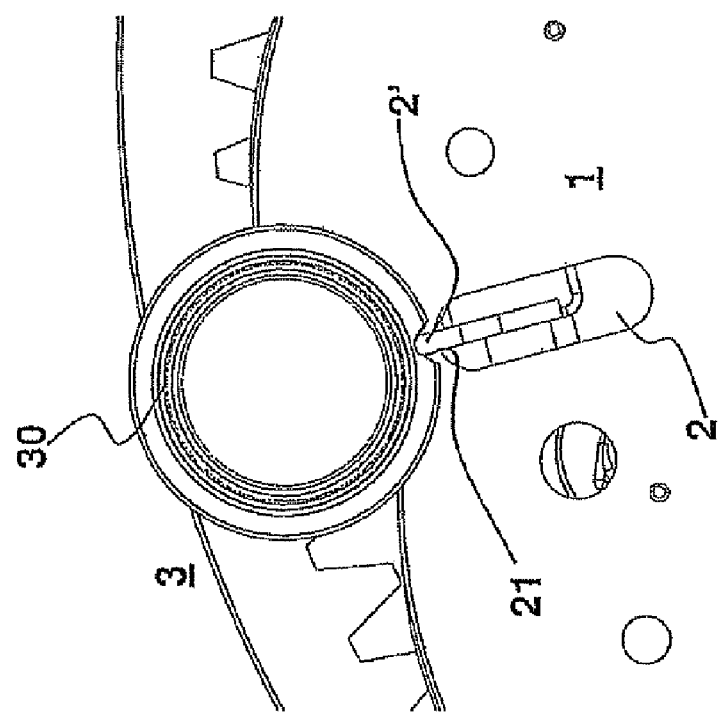
FIGS. 5a and 5b are top views of a preform on the loading drum in FIG. 2, in first and second positions, respectively.
Figure 5B:
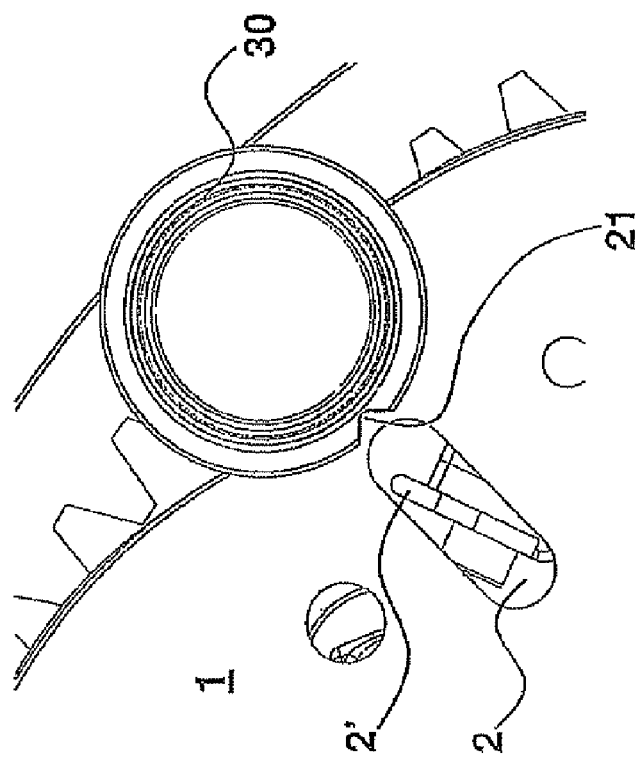
Figure 9:
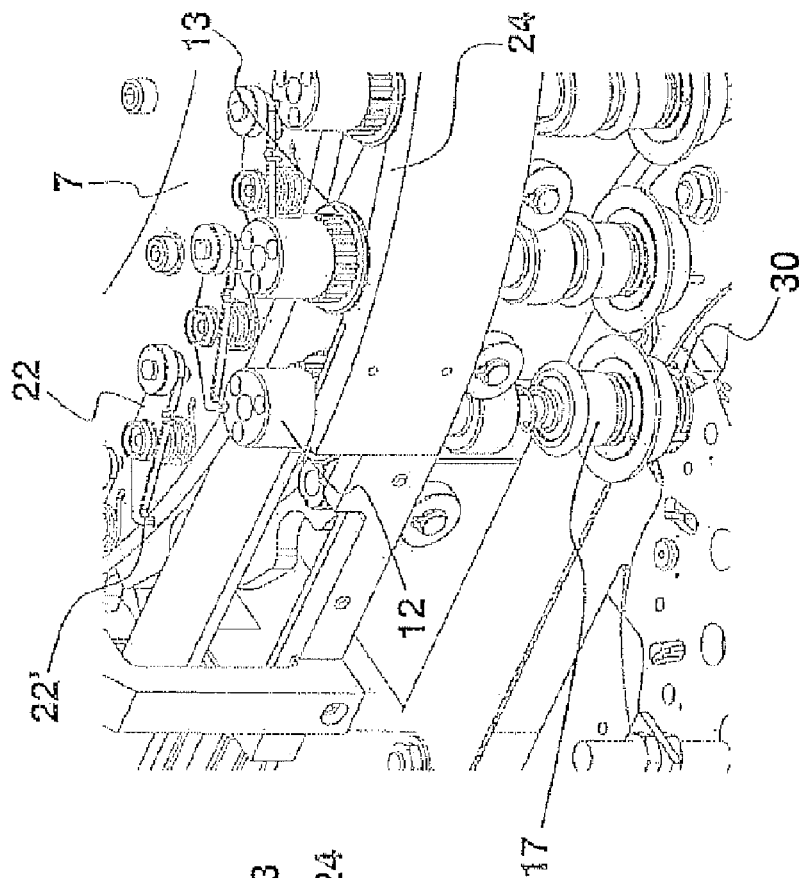
FIGS. 8 and 9 are axonometric views of different parts of the wheel in FIG. 6.
Figure 8:
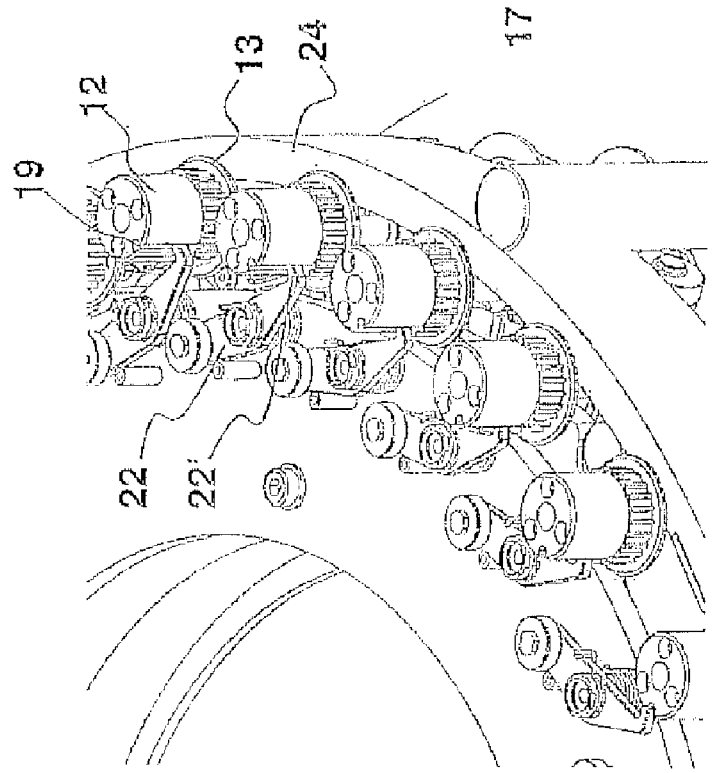
Figure 11:
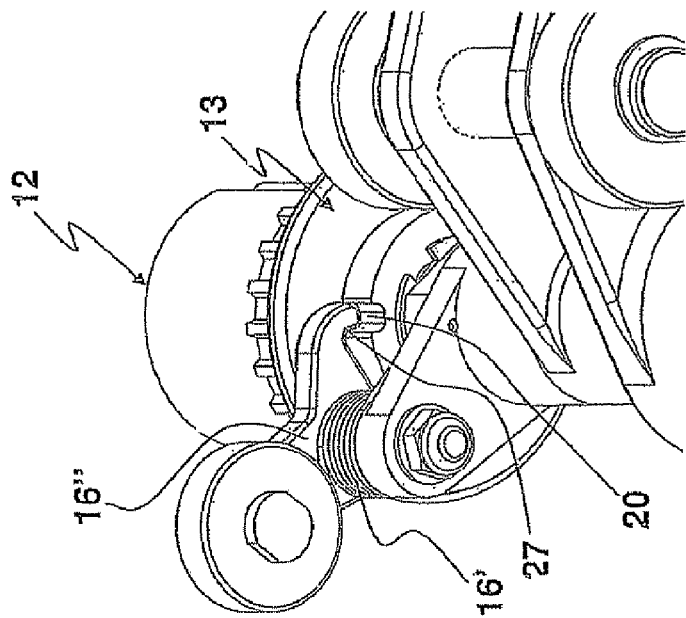
FIG. 11 is a view of the final orientation means of the chain link.
Figure 10:
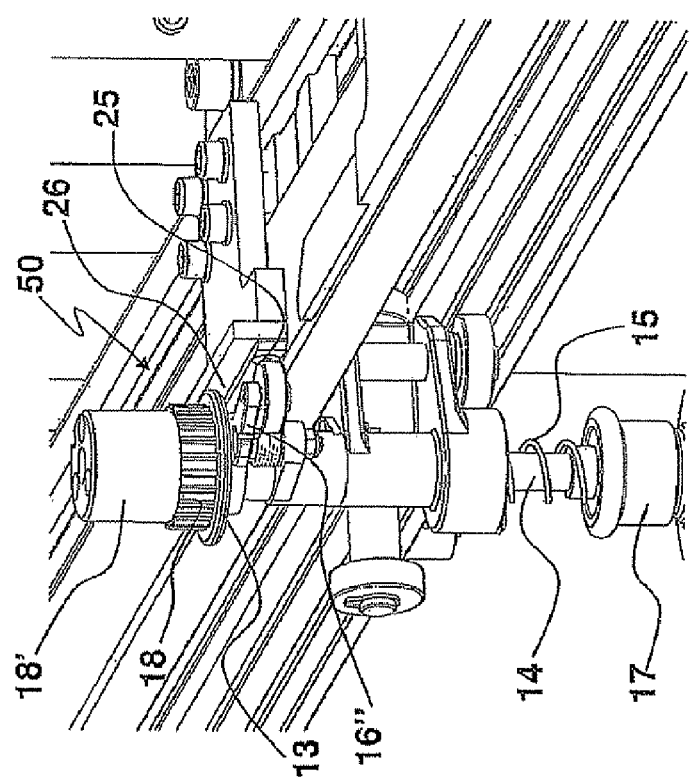
FIG. 10 is an axonometric view of a conveying chain link at the final orientation zone of the preforms.
Figure 13:
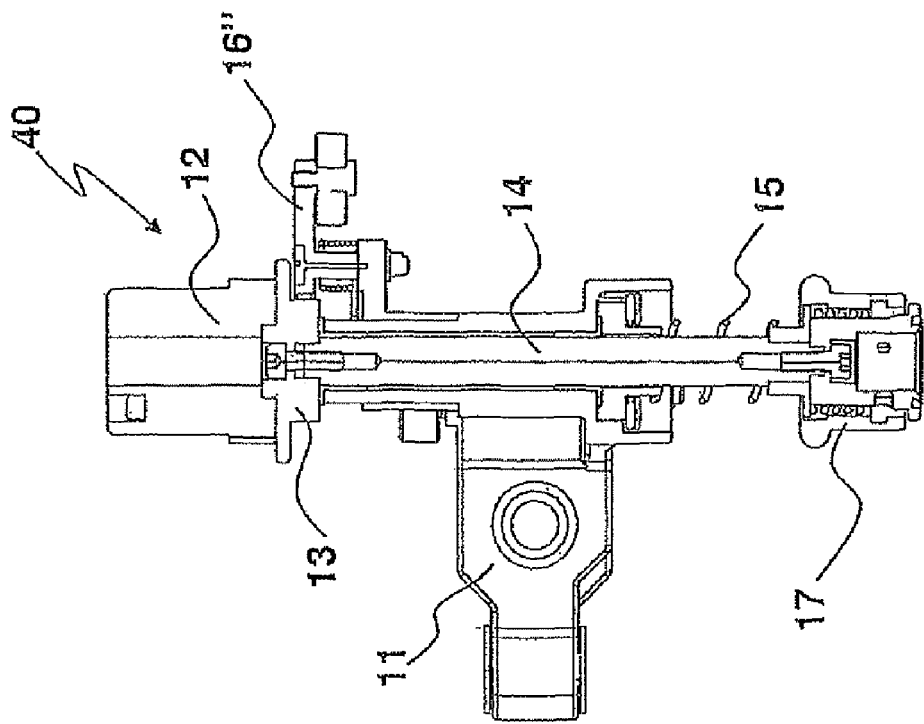
FIG. 13 is a cross section of the link in FIG. 12.
Figure 12:
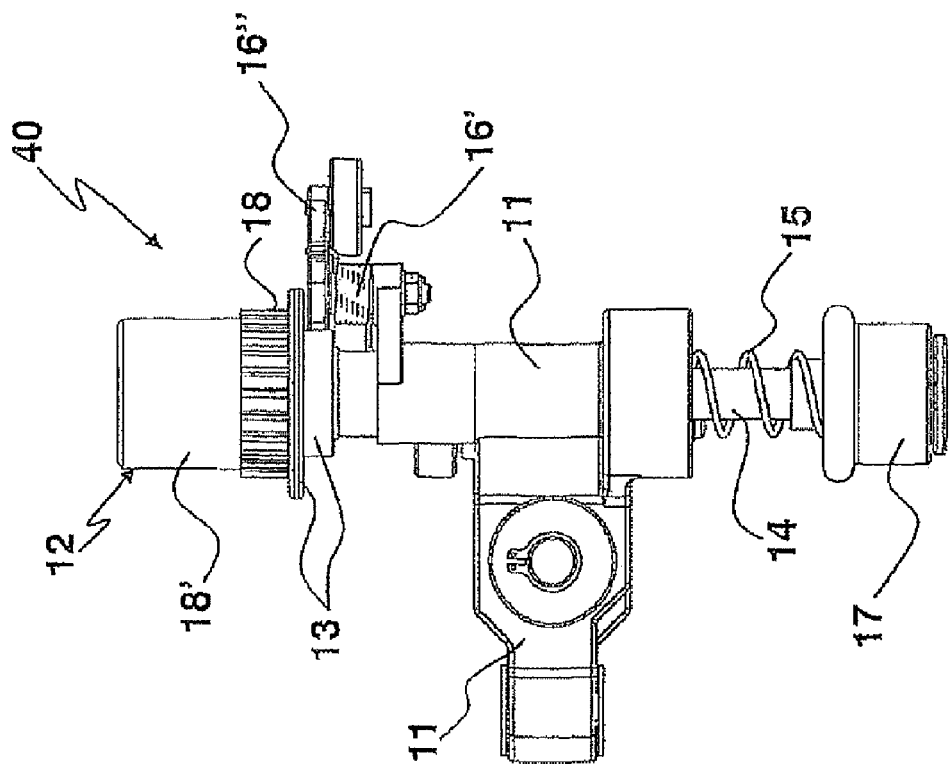
FIG. 12 is a side view of a conveying chain link.

FIG. 5a shows a preform lust loaded onto the loading drum with the corresponding insert 2' in a retracted position; FIG. 5b instead shows the same preform in a subsequent moment, with the insert 2' accommodated in the notch 21.

Following the orientation of the preform 30 on the loading drum 1, it is passed onto the conveying chain 4 by the pad 40 fastening the preform 30.

Pad Orientation System on the Wheel 7

The orientation system for pads 40, provided on the wheel 7, comprises:
  a plurality of levers 22, provided with respective protuberances 22', e.g. bolt-shaped, hinged and arranged along a circumference close to the outer edge of the wheel 7;
  a cam 23, placed over the wheel 7 at the chain link inlet zone on said wheel, adapted to operate the levers 22 for orienting the existing pads in at least some of the links of the chain.

Each bolt 22', when the chain 4 is fed about the wheel 7, thus presses on the rotation pinion 12 present on a corresponding link of the chain to meet the orientation notch 19. This operation is facilitated by the fact that when the chain 4 is fed, it rotates about itself by virtue of the fixed cam guide or track 24. Once the bolt 22' is inserted in the notch 19, the pads keep a predetermined angular orientation to completely fasten the corresponding, previously oriented preforms which rotate on the loading drum.

Fastening the Preforms by the Pads, Heating, Finally Orienting and Ejecting them from the Conveying Chain The pads 40 were previously oriented on the wheel 7 at the cooperation zone between the wheel 7 and the loading drum 1. The preforms are loaded in a descent zone of the conveying chain 4 at the end of the fixed cam track 24.

A vertical downward movement of the previously oriented pads 40 allows the introduction of the customized quick fastening part thereof into the neck of the respective preforms, also rotating and already oriented on the loading drum 1.

The loading drum 1 and the wheel 7 are advantageously synchronized so as to ensure a perfect fastening of the preforms by the respective pads.

At this point the preforms, inserted on the pads, keep the orientation no longer with the loading drum but with respect to the respective pads along the conveying circuit to their ejection from the chain 4.

Along this circuit, the integral pad-preform pairs associated with at least one of the links of the chain 4 are advantageously free to rotate about a rotation axis when passing in at least one zone of said circuit comprising, for example, at least one oven 5 for an optimal thermal conditioning of the preform body, excluding the neck, for preparing the step of blowing.

For example, in case of a conveying of previously blown containers, the passing zone in which the integral pad-container pairs, associated with at least some links of the chain 4, are free to rotate about a rotation axis comprises, for example, a system for applying a coating or paint.

This rotation is caused by the interference between the toothed zone 18 of each rotation pinion 12 and a toothed belt or other appropriate means included in the ovens 5.

Once the orientation zone 6, possibly with varying pitch, has been reached the pads are oriented again by the respective orientation levers 16", provided with respective protuberances 27 e.g. in the form of a bolt and provided on the body 11 of the pad.

A cam 25, placed on a section of feeding track 50 of the chain 4 close to the inlet zone on the conveying wheel 7, operates the orientation lever 16" so that the bolt 27 presses on the lower cylindrical section of the plate 13, while a contact zone 26 of the section of track 50 with the upper cylindrical section of the plate 13 allows the rotation of the plate itself, generated by friction, and thus of the pinion-plate-rotation pin-fastening end block forming the pad, about the axis thereof. This rotation allows the bolt 27 to be inserted into the centering notch 20 of the lower cylindrical section of the plate 13. The latter orientation of the plate determines the final orientation position of the preform before it is ejected from the end 17 of the pad.

The preforms are ejected at a predetermined angular orientation from the chain 4 by means of an ejection device which expels a predetermined number of preforms pushing them downwards into corresponding grippers. These grippers, each comprising two jaws which jointly define the shape of a cup, adapted to grip a preform over the neck ring, are actuated by a feeding device which, without making them rotate, transfers them through the zone 8 close to the machine or blowing press 9.

The feeding device advantageously is of the varying pitch-type when the distance between centers of the molds of the blowing machine 9 is greater than the distance between centers of the preforms in the conveying chain 4.

The varying-pitch feeding device arranges the oriented preforms at the blowing pitch and a transfer device then picks the preforms from the grippers and transports them to the mold of the machine or blowing press 9.

Lifting the pad 17, at the inlet zone of the wheel 7, after having ejected the preform, occurs by means of the lifting plate 13 which allows the rotation pin 14 to be lifted by virtue of the shape of the aforesaid fixed cam guide or track 24.

Lifting the rotation pin 14 results in the compression of the spring 15.

The plate 13 further allows the rotation of the rotation pin 14 if the set consisting of pinion 12, lifting plate 13 and pin 14 itself is present in a raised position and without any friction on the toothed zone 18 of the pinion 12. In this case, the rotation of the pads about an axis thereof is operated by the friction between the base or side surface of the upper cylindrical section of the plate 13 and the fixed cam track 24. This rotation serves to orient the pads again with respect to the loading drum by means of a plurality of levers 22 provided with bolt 22', and of the fixed cam 23.

Once the descent zone has been reached for fastening new preforms, the spring 15 allows the rapid descent of the pad after releasing the lifting plate 13 at the end of the fixed cam track 24.

The conveying cycle thus starts again from the fastening of new preforms by the loading drum.

Appropriate control means are advantageously included, comprising for example stopper devices adapted to check the position of inserts 2' and bolts 22' which identify the orientation of preform and pad, respectively. Thereby, it is possible to check whether the preforms and pads are correctly oriented.

The solution suggested by the present invention allows to obtain an accurate orientation of the preforms to be inserted into the molds of the blowing machine with low costs without needing to include complex, highly expensive, mechanical control systems.

A further advantage is that the orientation angle may be simply changed by intervening on the fixing means, e.g. screws, which fix the smooth zone 18' of the rotation pinion 12, provided with the orientation notch 19, to the lifting plate 13.

The invention claimed is:

1. A conveying system for plastic material containers, in particular preforms, the containers having a predetermined reference point; the system comprising:
    a conveying chain for the containers, defining a closed conveying circuit, rotating about a conveying wheel,
    a loading wheel of the containers onto the closed conveying circuit, arranged close to said conveying wheel,
    a plurality of pads for gripping respective containers in a cooperation zone with the loading wheel, so as to define integral pad-container pairs, said pads being provided on the conveying chain,
    at least one passing zone of the containers, arranged along said closed circuit, wherein said integral pad-container pairs are free to rotate about a rotation axis, wherein there are comprised:
    first means for defining the angular position of the containers on said loading wheel,
    second means for defining the angular position of the pads on said conveying wheel, to orient the pads before gripping the corresponding containers, and
    third means for defining the angular position of said integral pad container pairs for orienting the containers after exiting from said at least one passing zone.

2. The system according to claim 1, wherein said first means for defining the angular position of the containers comprise a first cam and orientation inserts of the containers adapted to be operated by said first cam so as to block the respective containers in a predetermined angular position, first cam and orientation inserts being arranged in the loading wheel.

3. The system according to claim 2, wherein a second cam is arranged outside the loading wheel so as to generate a rotation of the containers about an axis thereof by friction.

4. The system according to claim 3, wherein said first cam is arranged underneath the loading wheel and the orientation inserts protrude from specific slots provided on the loading wheel, so as to be able to cooperate, once operated, with a neck of a respective container during said rotation.

5. The system according to claim 3, wherein said second means for defining the angular position of the pads comprise a first plurality of levers, provided with respective protuberances and arranged along a circumference close to an external edge of the conveying wheel, and a third cam adapted to operate the levers to block respective pads in a predetermined angular position by means of said protuberances.

6. The system according to claim 5, wherein a fourth cam is provided outside the conveying wheel so as to generate a rotation of the pads about an axis thereof by friction.

7. The system according to claim 6, wherein the third cam is placed over the conveying wheel at an inlet zone of the links of the conveying chain on said conveying wheel.

8. The system according to claim 6, wherein said fourth cam has a substantially semicircle shape in plan which is concentric to the conveying wheel, and has a side profile provided at the two ends with a respective chute so as to lift the pads at the inlet zone on said conveying wheel and to lower said pads at an outlet zone of said conveying wheel, respectively.

9. The system according claim 6, wherein said third means for defining the angular position of the integral pad-container pairs comprise a second plurality of levers, provided with respective protuberances and each arranged on a body of a respective pad, and a fifth cam provided on a track section of said chain close to the inlet zone on the conveying wheel, said fifth cam being adapted to operate the levers to block the respective pads again in a predetermined angular position by means of said protuberances.

10. The system according to the claim 9, wherein a contact zone of said track section with a part of the pads is provided so as to generate a rotation of the pads about an axis thereof by friction.

11. A method of defining the angular position of plastic material containers, specifically preforms, in a conveying system for said containers the system including a conveying chain of the containers, defining a closed conveying circuit, rotating about a conveying wheel; a loading wheel of the containers on the closed conveying circuit, arranged close to said conveying wheel; a plurality of pads for gripping respective containers in a cooperation zone with the loading wheel, so as to define integral pad-container pairs, said pads being provided on the conveying chain; at least one passing zone of the containers, arranged along said closed circuit, wherein said integral pad-container pairs are free to rotate about a rotation axis; the method comprising the following stages:
    defining the angular position of the containers by means of first angular position defining means on the loading wheel,
    defining the angular position of the pads by means of second angular position defining means on the conveying wheel, before gripping the corresponding containers, and defining the angular position of the integral pad-container pairs by means of third angular position defining means after exiting from said at least one passing zone.

12. The method according to claim 11, wherein the definition of the angular position of the containers on the loading wheel includes the operation of orientation inserts, by means of a first cam, so that each insert exerts a pressure on a respective container neck until it is inserted into a first recess provided on said neck.

13. The method according to claim 12, wherein each container is fed on the loading wheel by rotating about an axis thereof by friction with a second cam, arranged outside the loading wheel, until the insert is inserted into the first recess.

14. The method according to claim 13, wherein the definition of the angular position of the pads on the conveying wheel includes the operation of a first plurality of levers, by means of a third cam, so that each lever exerts a pressure on a first upper part of a respective pad until it is inserted, by means of a respective protuberance, into a second recess provided on said first upper part.

15. The method according to claim 14, wherein each pad is fed on the conveying wheel by rotating about an axis thereof by friction with a fourth cam, arranged outside the conveying wheel, until the protuberance is inserted into the second recess.

16. The method according to claim 15, wherein the definition of the angular position of the integral pad-container pairs, after exiting from said at least one passing zone, includes the operation of a second plurality of levers, each provided on a body of a respective pad by means of a fifth cam provided on a track section of the chain so that each lever exerts a pressure on a second upper part of a respective pad until it is inserted by means of the respective protuberance into a third recess provided on said second upper part.

17. The method according to claim 15, wherein each pad, after exiting from said at least one passing zone, is fed along the conveying line by rotating about an axis thereof by friction of a contact zone with said track section until the protuberance is inserted into the third recess.

18. The system according to claim 7, wherein said fourth cam has a substantially semicircle shape in plan which is concentric to the conveying wheel, and has a side profile provided at the two ends with a respective chute so as to lift the pads at the inlet zone on said conveying wheel and to lower said pads at an outlet zone of said conveying wheel, respectively.

* * * * *